(12) United States Patent
Balasubramanian et al.

(10) Patent No.: US 10,706,095 B2
(45) Date of Patent: Jul. 7, 2020

(54) REDIRECTING BLOCKED MEDIA CONTENT

(71) Applicant: International Business Machines Corporation, Armonk, NY (US)

(72) Inventors: Swaminathan Balasubramanian, Troy, MI (US); Ravi P. Bansal, Tampa, FL (US); Santosh S. Borse, Ossining, NY (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 15/710,299

(22) Filed: Sep. 20, 2017

(65) Prior Publication Data
US 2019/0087422 A1    Mar. 21, 2019

(51) Int. Cl.
*G06F 16/435* (2019.01)
*H04H 60/45* (2008.01)
*H04H 60/37* (2008.01)
*G06F 16/438* (2019.01)
*G06F 16/78* (2019.01)
*G06F 16/58* (2019.01)
(Continued)

(52) U.S. Cl.
CPC .......... *G06F 16/435* (2019.01); *H04H 60/37* (2013.01); *H04H 60/45* (2013.01); *H04H 60/65* (2013.01); *H04N 21/44008* (2013.01); *H04N 21/44029* (2013.01); *H04N 21/4532* (2013.01); *H04N 21/4542* (2013.01); *G06F 16/4387* (2019.01); *G06F 16/4393* (2019.01);
(Continued)

(58) Field of Classification Search
CPC .......... H04N 21/4532; H04N 21/4542; H04N 21/454; G06F 15/16; G06F 16/435; G06F 16/4387; G06F 16/58; G06F 16/74; G06F 16/78
USPC ................ 707/748, 713, 754, 757, 758, 913
See application file for complete search history.

(56) References Cited

U.S. PATENT DOCUMENTS 6,720,880 B2    4/2004  Gutta et al.
7,380,258 B2    5/2008  Durden et al.
(Continued)

FOREIGN PATENT DOCUMENTS

EP    2104349 A2    9/2009
EP    2104349 A3    12/2009
EP    2104349 B1    11/2011

*Primary Examiner* — Dangelino N Gortayo
(74) *Attorney, Agent, or Firm* — Cantor Colburn LLP; Samuel Waldbaum

(57) ABSTRACT

A method includes determining, using a processor system, that a portion of media content is objectionable to an audience based at least on a comparison between an identified aspect of the portion of media content and a first set of preferences associated with the audience. The first set of preferences defines a type of media content corresponding to the portion of media content as being objectionable to the audience. The audience is associated with a primary viewing device. The method also includes determining that the portion of media content is not objectionable to a member of the audience based at least on a second set of preferences. The second set of preferences defines the type of media content corresponding to the portion of media content as not being objectionable to the member. The method can transmit the portion of the media content to a secondary display device of the member.

20 Claims, 7 Drawing Sheets

(51) Int. Cl.
  H04N 21/44    (2011.01)
  H04H 60/65    (2008.01)
  H04N 21/454   (2011.01)
  H04N 21/45    (2011.01)
  H04N 21/4402  (2011.01)
  H04N 21/488      (2011.01)
  H04N 21/8549     (2011.01)
  H04N 21/258      (2011.01)
  H04H 60/47       (2008.01)

(52) U.S. Cl.
  CPC .............. *G06F 16/58* (2019.01); *G06F 16/78* (2019.01); *H04H 60/47* (2013.01); *H04N 21/25866* (2013.01); *H04N 21/454* (2013.01); *H04N 21/4882* (2013.01); *H04N 21/8549* (2013.01)

(56) References Cited

U.S. PATENT DOCUMENTS

| | | | |
|---|---|---|---|
| 8,312,484 B1* | 11/2012 | McCarty | H04N 21/4542 725/28 |
| 8,347,325 B2 | 1/2013 | Price et al. | |
| 8,687,054 B1* | 4/2014 | Elwell | H04N 21/23439 348/55 |
| 8,812,499 B2 | 8/2014 | Sathish et al. | |
| 9,313,545 B2 | 4/2016 | Meredith et al. | |
| 9,456,255 B2 | 9/2016 | Fradet et al. | |
| 9,514,136 B2* | 12/2016 | Scheer | G06F 16/447 |
| 9,660,950 B2* | 5/2017 | Archibong | H04L 51/32 |
| 10,277,948 B2* | 4/2019 | Meijer | H04N 21/4227 |
| 2002/0194586 A1 | 12/2002 | Gutta et al. | |
| 2007/0126884 A1 | 6/2007 | Xu et al. | |
| 2008/0134282 A1* | 6/2008 | Fridman | G06Q 10/10 726/1 |
| 2010/0162285 A1 | 6/2010 | Cohen et al. | |
| 2011/0185437 A1* | 7/2011 | Tran | H04L 63/104 726/28 |
| 2011/0321075 A1 | 12/2011 | Brunkhorst et al. | |
| 2012/0054311 A1 | 3/2012 | Mizuno et al. | |
| 2013/0073567 A1* | 3/2013 | Basso | H04N 21/4394 707/748 |
| 2014/0259046 A1* | 9/2014 | Ren | H04N 21/4542 725/28 |
| 2016/0112760 A1 | 4/2016 | Kosseifi et al. | |
| 2018/0287976 A1* | 10/2018 | Hochstein | H04L 51/10 |
| 2019/0034426 A1* | 1/2019 | Hodge | G06Q 10/06311 |
| 2019/0066279 A1* | 2/2019 | Monkarsh | G06T 5/10 |

* cited by examiner

REDIRECTING BLOCKED MEDIA CONTENT

BACKGROUND

The present invention generally relates to media content delivery systems. More specifically, the present invention relates to blocking media content from being viewed by an audience member whose profile considers the media content to be objectionable and/or inappropriate and redirecting the blocked media content to another audience member whose profile does not consider the media content to be objectionable and/or inappropriate.

Different types of media content can be intended for different types of audience members. Because different audience members have different sensitivities, one type of media content that is considered to be appropriate for one audience member can be considered to be inappropriate for another audience member. Audience members generally attempt to determine whether media content is appropriate for them by referring to an assigned rating of the media content. For example, movie media content can be assigned a Motion Picture Association of America (MPAA) rating (i.e., a rating of G, PG, PG-13, R, etc.) that can be referred to by audience members as they attempt to determine whether the media content is appropriate for viewing. Similar content rating systems exist for television media content.

SUMMARY

Embodiments of the present invention are directed to a computer-implemented method for redirecting media content. A non-limiting example of the computer-implemented method includes determining, using a processor system, that a portion of media content is objectionable to an audience based at least on a comparison between an identified aspect of the portion of media content and a first set of preferences associated with the audience. The first set of preferences defines a type of media content corresponding to the portion of media content as being objectionable to the audience. The audience is associated with a primary viewing device. The method also includes determining that the portion of media content is not objectionable to a member of the audience based at least on a second set of preferences. The second set of preferences defines the type of media content corresponding to the portion of media content as not being objectionable to the member. The method also includes transmitting the portion of the media content to a secondary viewing device of the member of the audience.

Embodiments of the present invention are directed to a system for redirecting media content. A non-limiting example of the system includes a memory. The system also includes a processor system communicatively coupled to the memory. The processor system is configured to perform a method including determining that a portion of media content is objectionable to an audience based at least on a comparison between an identified aspect of the portion of media content and a first set of preferences associated with the audience. The first set of preferences defines a type of media content corresponding to the portion of media content as being objectionable to the audience, and the audience is associated with a primary viewing device. The method also includes determining that the portion of media content is not objectionable to a member of the audience based at least on a second set of preferences. The second set of preferences defines the type of media content corresponding to the portion of media content as not being objectionable to the member. The method also includes transmitting the portion of the media content to a secondary viewing device of the member of the audience.

Embodiments of the invention are directed to a computer program product for redirecting media content, the computer program product comprising a computer readable storage medium having program instructions embodied therewith. The program instructions are executable by a processor to cause the processor to perform a method. A non-limiting example of the method includes determining that a portion of media content is objectionable to an audience based at least on a comparison between an identified aspect of the portion of media content and a first set of preferences associated with the audience. The first set of preferences defines a type of media content corresponding to the portion of media content as being objectionable to the audience, and the audience is associated with a primary viewing device. The method also includes determining that the portion of media content is not objectionable to a member of the audience based at least on a second set of preferences. The second set of preferences defines the type of media content corresponding to the portion of media content as not being objectionable to the member. The method also includes transmitting the portion of the media content to a secondary viewing device of the member of the audience.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
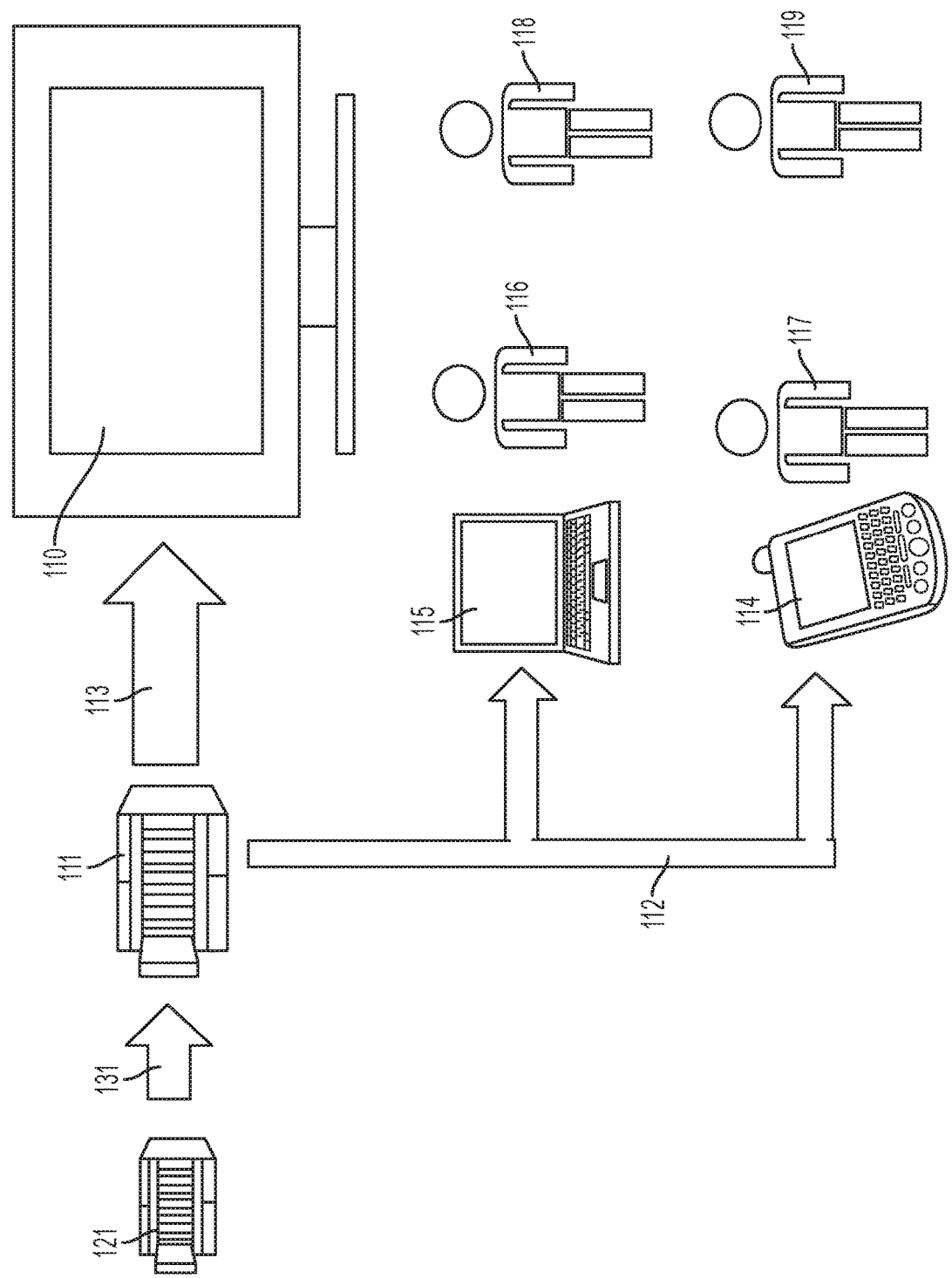
FIG. 1 depicts a system for filtering, blocking, and redirecting media content in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, current audience members can rely on blocking devices to ensure that media content is appropriate for viewing. A blocking device refers to an electronic device that can be installed within television set receivers to filter/block display of the media content based on the ratings that have been assigned to the media content. For example, the electronic device can block any viewing of media content that is rated PG-13 and rated R. Further, blocking devices can also block portions of media content based on content tagging where specific portions of the media content are tagged as being potentially objectionable.

However, blocking devices which perform blocking of media content (in accordance with an assigned MPAA rating) generally block the entire media content from being viewed. In other words, when blocking media content based on assigned MPAA ratings, the blocking devices generally do not limit the blocking to only a portion of the total media content to which the MPAA rating is assigned. For example, if a film is rated R and the blocking device is configured to block rated R content, then the blocking device will generally block the entire film from being viewed, as opposed to only blocking certain portions of the rated R film from being viewed. Therefore, when blocking devices perform blocking of media content in accordance with the assigned MPAA rating, viewers are generally not able to view any portion of the blocked media content.

Other current approaches attempt to block/filter media content based on electronic tags that are assigned to portions of the media content. Specifically, with the current approaches, a portion of the media content can be tagged as possibly being objectionable. Different tag types can correspond to different types of objectionable content, and thus tags can identify one or more aspects of the portion of the media content. For example, tags can indicate that a portion of content has: (1) a depiction of a violent act, (2) a depiction of physical intimacy, (3) a depiction of a disturbing scenario, (4) a depiction of a thriller scenario, (5) a depiction of a health problem, and/or (6) a depiction of dialogue with offensive language, etc.

With the current approaches, if a tag indicates that a portion of content is a type of content that is objectionable to an audience, the tagged content is thus blocked to all members of the audience. Although there may be some members of the audience that prefer to view blocked content (and who do not consider the blocked content as being objectionable), the current approaches will nevertheless block the tagged content from all viewers without any regard to the preferences of those who wish to view the tagged content. As such, blocking/filtering away content in accordance with the current approaches will inevitably affect the audience members who prefer to view/access the tagged content. If audience members who prefer to view the blocked content are prevented from viewing the blocked content, these audience members can experience a loss of continuity as they have missed a portion of the media content.

Turning now to an overview of the aspects of the invention, one or more embodiments of the invention address the above-described shortcomings of the prior art by providing methods, systems, and computer program products that perform redirection of media content that is filtered and/or blocked from being viewed by an audience, as described in more detail below. With one or more embodiments, specific portions of media content that are considered to be objectionable can be blocked from being viewed by an audience.

After these specific portions of media content are blocked from being viewed by the audience, one or more embodiments can redirect the blocked content to specific audience members whose profiles do not consider the blocked content to be objectionable or inappropriate. In addition to blocking/redirecting portions of visual media content, other embodiments can be directed to blocking/redirecting portions of audio-only media content. In other words, one or more embodiments can block/redirect media content that is entirely audio content. For example, one or more embodiments can block and redirect portions of an audio recording. Further, one or more embodiments can block just the audio of a specific portion of media content. In such a case, one or more embodiments can block the audio of media content while allowing the visuals/video of the media content to be viewed. With regard to redirecting of media content, the redirected media content can be in the form of video and/or audio. The redirected media content can also be in the form of a textual summary. The redirected media content can also be in the form of scene images with accompanying descriptive text, for example.

FIG. 1 depicts a system that is configured to filter, block, and redirect media content in accordance with one or more embodiments of the present invention. Distribution device 121 can be an electronic networking device that can distribute media content to audience members (116-119). As described above, if a portion of media content includes a type of content that can possibly be considered to be objectionable/inappropriate by a profile of a viewer, then this portion can be electronically tagged with a tag that indicates the content type. Filtering device 111 can filter portions of the media content based on the tags that have been assigned to the portions, as described in more detail below.

Distribution device 121 can distribute media content in the form of analog transmissions, digital transmissions, satellite transmissions, cable transmissions, high-definition television transmissions, and/or internet protocol television transmissions, for example. In one or more embodiments of the present invention, distribution device 121 can also act as an electronic repository of media content that is to be distributed. Distribution device 121 can transmit the media content (and any associated tags) to the filtering device 111 via a transmission 131. Although FIG. 1 depicts distribution device 121 and filtering device 111 as separate devices, one or more embodiments can implement distribution device 121 and filtering device 111 within a single device.

Filtering device 111 is configured to use an electronic filter to filter the media content that is received from distribution device 121. Filter device 111 configures the parameters of the electronic filter based at least on audience preferences. When filter device 111 applies the electronic filter to the media content, the electronic filter will filter away portions of content that are defined as objectionable by the audience preferences. For each portion of media content, filter device 111 can determine if the portion of media content has been tagged as a type of content that should be filtered away by the electronic filter. After the media content is filtered by filtering device 111, the filtered media content is transmitted (via transmission 113) to primary viewing device 110, which is being viewed by audience (116-119). Primary viewing device 110 can be a television screen, movie screen, computer screen, tablet, and/or any other type of device that displays video and/or audio.

Although FIG. 1 depicts filtering device 111 and primary viewing device 110 as separate devices, one or more embodiments can implement filtering device 111 and primary viewing device 110 as a single device.

The content that is removed/filtered away by filtering device 111 is content that is defined by the audience's preferences as being objectionable. However, there can still be a few audience members (i.e., such as audience member 116 and audience member 117) that do not consider the removed content to be objectionable or inappropriate. For example, audience member 116 and audience member 117 can prefer to view the removed content.

Filtering device 111 is configured to determine the audience members who do not consider the removed content to be objectionable, if any. These audience members who do not consider the removed content to be objectionable can prefer to view/access the removed content. Filtering device 111 can determine if an audience member wants to view the removed content based on information contained within an electronic profile of the audience member, for example. Therefore, by referring to the profiles of audience member 116 and audience member 117, filtering device 111 can determine that audience member 116 and audience member 117 wish to view the removed content. Filtering device 111 can then redirect the removed content to secondary viewing device 115 and secondary viewing device 114 that are owned by audience member 116 and audience member 117, respectively. Specifically, instead of transmitting the removed content to primary viewing device 110, filtering device 111 transmits the removed content to secondary viewing device 114 and secondary viewing device 115 via transmission 112.

Figure 2:
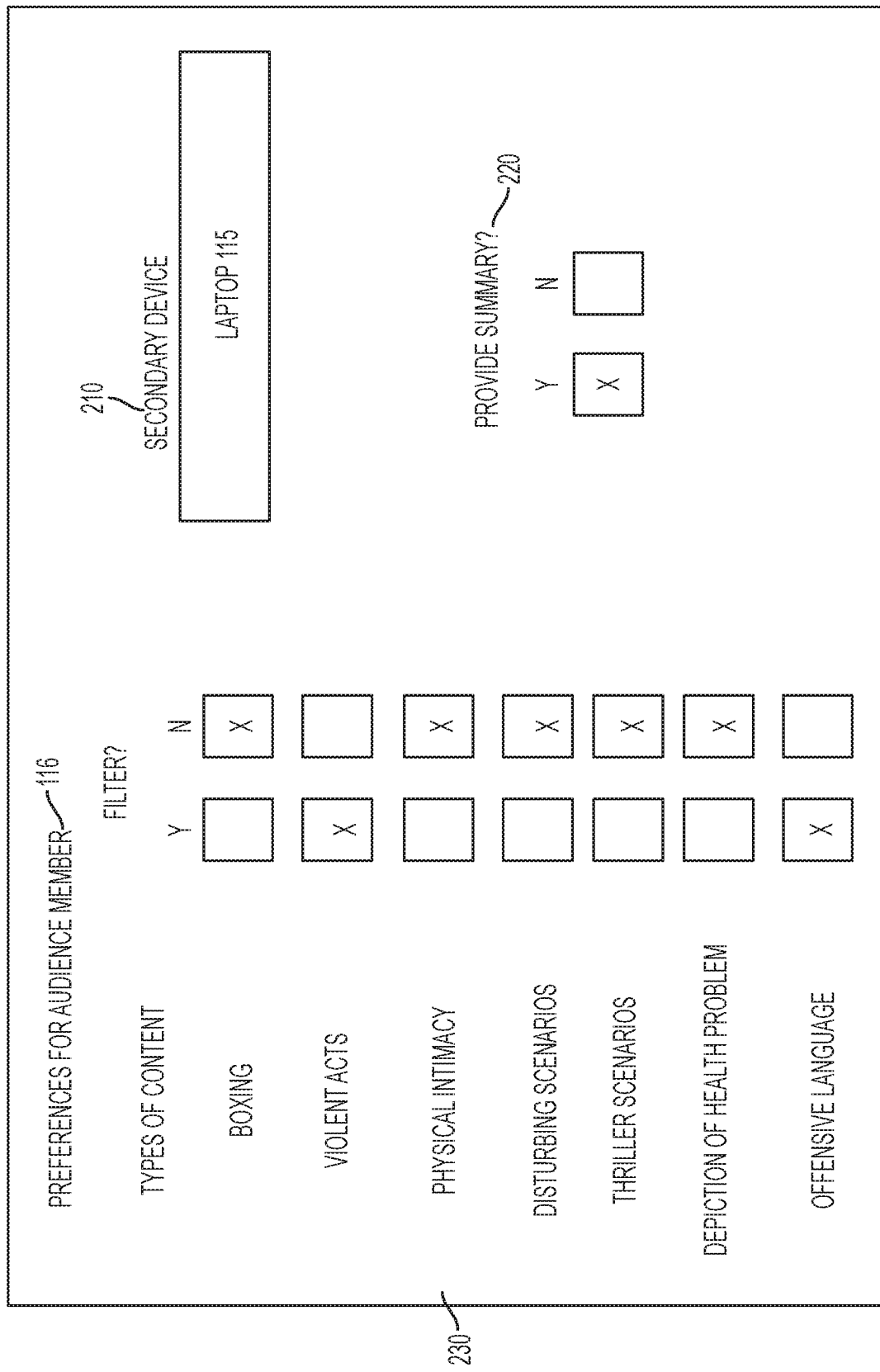
FIG. 2 depicts an interface that illustrates an example set of preferences for an audience member in accordance with one or more embodiments of the present invention.

FIG. 2 depicts an interface that illustrates an example set of preferences for audience member 116 in accordance with one or more embodiments of the present invention. With one or more embodiments, interface 200 can be displayed to allow each audience member to configure a set of preferences. For example, primary viewing device 110 and/or secondary viewing devices (114 and 115) can display interface 200 to the audience members. Referring to the example of FIG. 2, audience member 116 has configured a specific set of user preferences 230. As described above, the electronic filter of filtering device 111 can be configured based at least on the set of user preferences 230 for audience member 116 (and based at least on the set of user preferences for the other audience members). Specifically, audience member 116 has a configured profile that considers "violent acts" and "offensive language" as types of media content which are objectionable and thus should be filtered. However, the profile of audience member 116 does not consider "boxing," "physical intimacy," "disturbing scenarios," etc. as being objectionable, and thus would prefer to have these types of content redirected from primary viewing device 110 to laptop 115 (as shown in FIG. 1 and by the indicated "Secondary Device" 210 in FIG. 2). Further, "Provide summary" indication 220 indicates that audience member 116 would like to receive a summary of redirected media content, as described in more detail below.

Figure 3:
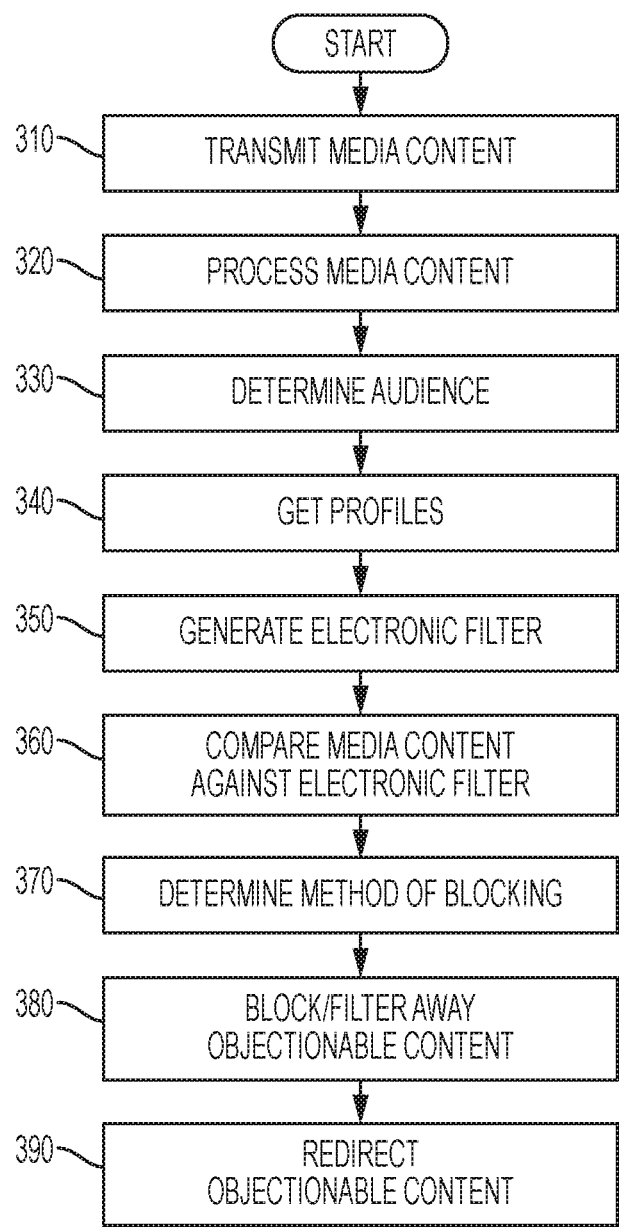
FIG. 3 depicts method steps of filtering, blocking, and redirecting media content in accordance with one or more embodiments of the present invention.

FIG. 3 illustrates method steps of filtering, blocking, and redirecting media content in accordance with one or more embodiments of the present invention. At 310, distribution device 121 can transmit media content to filtering device 111. At 320, filtering device 111 can receive the media content from distribution device 121 and can process the received media content. Filtering device 111 can process the received media content by determining whether the media content has any portions that have been electronically tagged as a type of objectionable content such as, for example: (1) depictions of violent acts, (2) depictions of fighting, (3)

depictions of physical intimacy, (4) depictions of a disturbing scenario, (5) depictions of thriller scenarios, (6) depictions of a health problem, and/or (7) depictions of dialogue with offensive language, etc.

At 330, filtering device 111 can determine the members of the viewing audience (116-119) for primary viewing device 110. For example, one or more audience members can register with filtering device 111 and/or with primary viewing device 110. With another embodiment, filtering device 111 can use a pre-configured audience and/or a default audience. At 340, filtering device 111 can retrieve an electronic profile for each member of the audience. As depicted by FIG. 2 above, the electronic profile that is associated with each audience member can reflect each audience member's preferences regarding which type of content is to be considered as objectionable content.

At 350, filtering device 111 can generate/configure an electronic filter that is to be applied to the media content. As described above, the electronic filter filters away content that is considered to be objectionable and/or inappropriate by the profiles of the audience. The parameters of the electronic filter can be derived from the profiles of the members of the audience. For example, one or more embodiments can configure the parameters of the electronic filter to filter away a type of content if the type of content is considered to be objectionable and/or inappropriate by a profile of at least one audience member. Another embodiment can configure the parameters of the electronic filter to filter away a type of content if the type of content is considered to be objectionable and/or inappropriate by all the profiles of all audience members. Another embodiment can configure the parameters of the filter in accordance with the preferences of the most-restrictive audience member. Other embodiments can use other methods to configure the parameters of the filter.

At 360, filtering device 111 compares the media content against the electronic filter (to filter the media content using the electronic filter). As described above, portions of the media content can be tagged with tags that indicate a type of content that is possibly objectionable. Filtering device 111 can filter away content that has been determined by the parameters (of the electronic filter) to be objectionable, where the portions of content are identified by assigned tags.

At 370, if portions of media content are to be filtered away, filtering device 111 determines a method of blocking/filtering away the objectionable content. The method of blocking/filtering away content can include at least one of skipping the objectionable content, blanking the video of the objectionable content, etc. Therefore, at 380, when primary viewing device 110 displays the media content, the objectionable content has been blocked/filtered away.

At 390, filtering device 111 redirects the objectionable content (that has been blocked/filtered away) to a secondary device of at least one audience member whose profile does not consider the content to be objectionable or inappropriate. Specifically, instead of transmitting the objectionable content to primary viewing device 110, filtering device 111 transmits the objectionable content to the secondary viewing device. The secondary viewing device can correspond to a smartphone, tablet, and/or any other type of display device of the audience member who receives the content. The audience member whose profile does not consider the blocked content to be objectionable or inappropriate can then access/view the blocked content on the secondary viewing device.

Filtering device 111 can redirect the blocked content to the secondary viewing device via the Internet, a short-messaging system (SMS), and/or any other similar means of connection. When the redirected content is available to be viewed/accessed by the secondary viewing device, one or more embodiments can transmit a push notification to an application that is implemented on the secondary viewing device. The push notification can notify the audience member that the blocked content is available. The audience member can then be prompted to view the blocked content.

At 390, filtering device 111 can also provide a summary of the blocked content to the audience member, as described in more detail below. As such, the secondary device owner can view the blocked content directly and/or view a summary of the blocked content.

Therefore, in contrast to the current approaches, one or more embodiments of the present invention can redirect blocked content and/or a summary of the blocked content to audience members whose profiles consider the blocked content to be appropriate. One or more embodiments are configured to dynamically summarize and redirect the blocked content. As such, the audience members whose profiles consider the blocked content to be acceptable are able to know what occurred during the portions that are blocked/filtered away.

Figure 4:
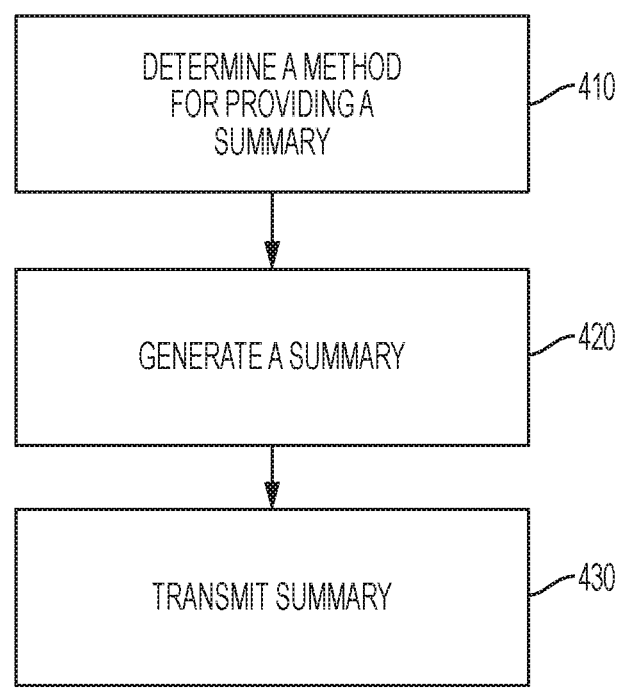
FIG. 4 depicts summarizing media content in accordance with one or more embodiments of the present invention.

FIG. 4 illustrates summarizing media content in accordance with one or more embodiments. The summarizing of media content can be performed, at least, within step 390 of FIG. 3. At 410, filtering device 111 determines a method for providing the summary. For example, the summary can be provided in the form of a written summary, a text message, and/or an SMS message, for example. In one or more embodiments, the profile of each audience member can define a preferred method for receiving the provided summary. At 420, filtering device 111 generates a summary for the audience members whose profiles do not consider the blocked content to be objectionable/inappropriate.

In order to generate the summary of the blocked content, one or more embodiments can generate a textual summarization (e.g., a text file) based on either an associated subtitle file (.SRT) and/or based on results of optical character recognition (OCR) that has been performed on closed-captioned text of the media content.

Another embodiment can generate the textual summarization of the media content by analyzing an audio stream of the blocked content. Another embodiment can generate the textual summarization by analyzing a video stream of the blocked content. Another embodiment can generate the textual summarization by referring to a crowd-sourced summary of the blocked content. Another embodiment can generate the textual summarization by analyzing available scripts/screenplays of the blocked content.

At 430, filtering device 111 transmits the generated summary to a secondary device of at least one audience member whose profile does not consider the blocked content to be objectionable or inappropriate. The profile of each audience member can indicate a secondary device that the generated summary/blocked content should be transmitted to.

Figure 5:
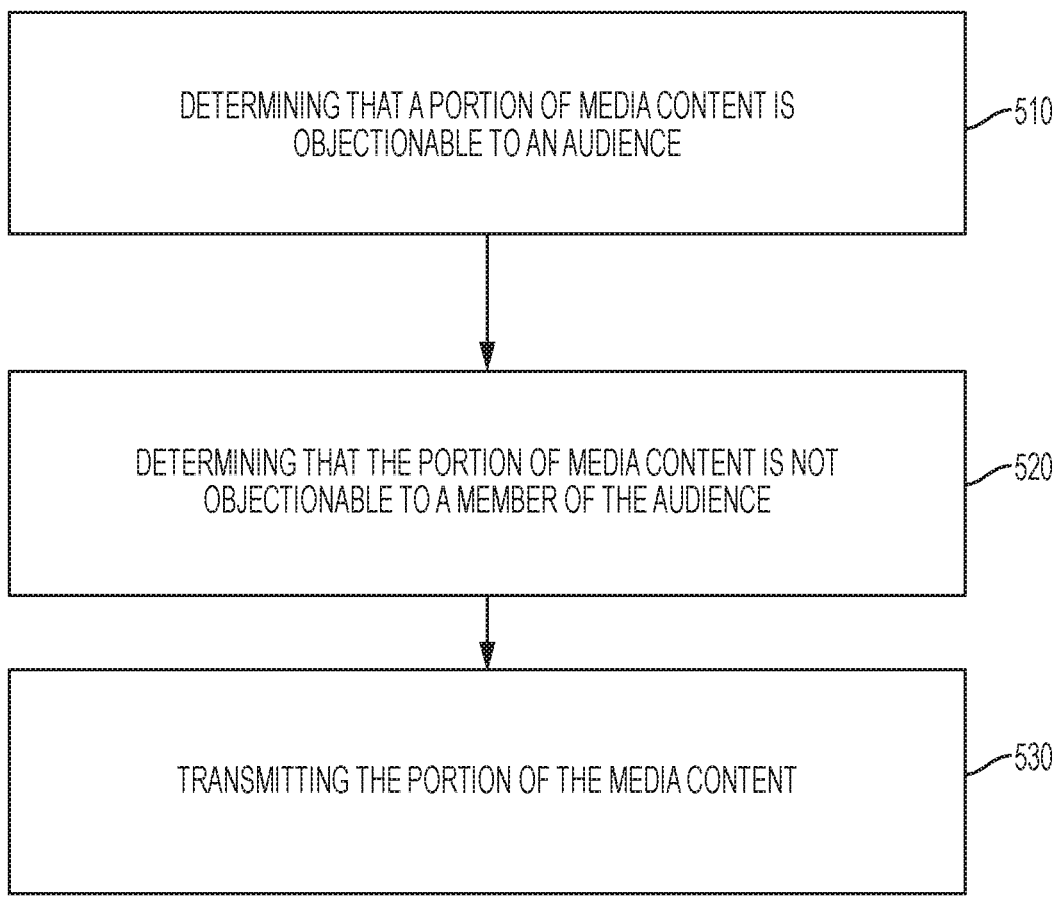
FIG. 5 depicts a flowchart of a method in accordance with one or more embodiments of the present invention.

FIG. 5 depicts a flowchart of a method in accordance with one or more embodiments. The method can be performed by an electronic controller of a display device, for example. The method includes, at block 510, determining that a portion of media content is objectionable to an audience based at least on a comparison between an identified aspect of the portion of media content and a first set of preferences associated with the audience. The first set of preferences defines a type of media content corresponding to the portion of media content as being objectionable to the audience, and the audience is associated with a primary viewing device. The method also includes, at block 520, determining that the portion of media content is not objectionable to a member of the audience based at least on a second set of preferences. The second set of preferences defines the type of media content corresponding to the portion of media content as not being objectionable to the member. The method also includes, at 530, transmitting the portion of the media content to a secondary viewing device of the member of the audience.

Figure 6:
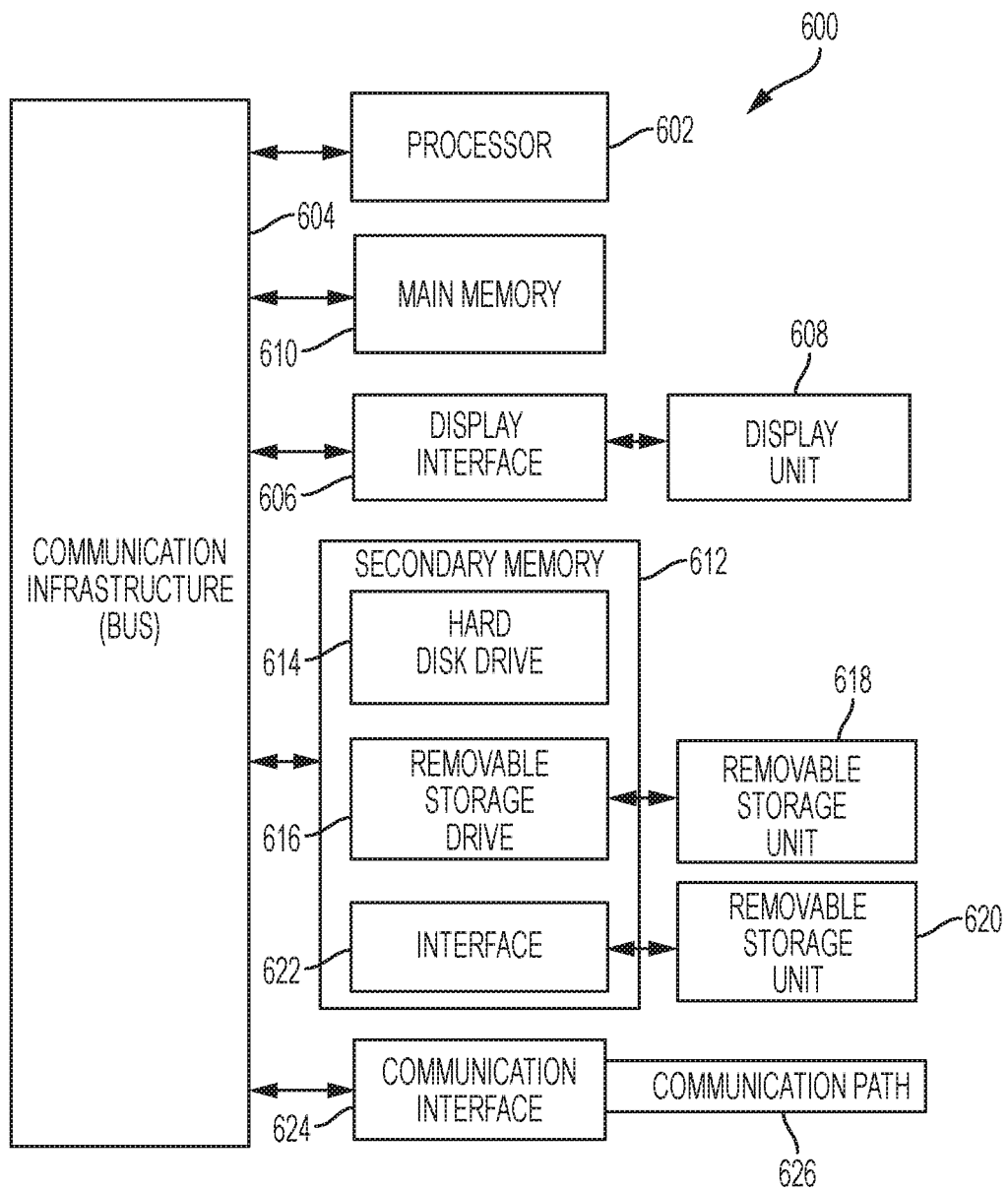
FIG. 6 depicts a high-level block diagram of a computer system, which can be used to implement one or more embodiments of the present invention.

FIG. 6 depicts a high-level block diagram of a computer system 600, which can be used to implement one or more embodiments. Computer system 600 can correspond to, at least, a distribution device and/or a filtering device that operates as a part of or in conjunction with a display device, for example. Computer system 600 can be used to implement hardware components of systems capable of performing methods described herein. Although one exemplary computer system 600 is shown, computer system 600 includes a communication path 626, which connects computer system 600 to additional systems (not depicted) and can include one or more wide area networks (WANs) and/or local area networks (LANs) such as the Internet, intranet(s), and/or wireless communication network(s). Computer system 600 and additional system are in communication via communication path 626, e.g., to communicate data between them.

Computer system 600 includes one or more processors, such as processor 602. Processor 602 is connected to a communication infrastructure 604 (e.g., a communications bus, cross-over bar, or network). Computer system 600 can include a display interface 606 that forwards graphics, textual content, and other data from communication infrastructure 604 (or from a frame buffer not shown) for display on a display unit 608. Computer system 600 also includes a main memory 610, preferably random access memory (RAM), and can also include a secondary memory 612. Secondary memory 612 can include, for example, a hard disk drive 614 and/or a removable storage drive 616, representing, for example, a floppy disk drive, a magnetic tape drive, or an optical disc drive. Hard disk drive 614 can be in the form of a solid state drive (SSD), a traditional magnetic disk drive, or a hybrid of the two. There also can be more than one hard disk drive 614 contained within secondary memory 612. Removable storage drive 616 reads from and/or writes to a removable storage unit 618 in a manner well known to those having ordinary skill in the art. Removable storage unit 618 represents, for example, a floppy disk, a compact disc, a magnetic tape, or an optical disc, etc. which is read by and written to by removable storage drive 616. As will be appreciated, removable storage unit 618 includes a computer-readable medium having stored therein computer software and/or data.

In alternative embodiments, secondary memory 612 can include other similar means for allowing computer programs or other instructions to be loaded into the computer system. Such means can include, for example, a removable storage unit 620 and an interface 622. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 620 and interfaces 622 which allow software and data to be transferred from the removable storage unit 620 to computer system 600.

Computer system 600 can also include a communications interface 624. Communications interface 624 allows software and data to be transferred between the computer system and external devices. Examples of communications interface 624 can include a modem, a network interface (such as an Ethernet card), a communications port, or a PC card slot and card, a universal serial bus port (USB), and the like. Software and data transferred via communications interface 624 are in the form of signals that can be, for example, electronic, electromagnetic, optical, or other signals capable of being received by communications interface 624. These signals are provided to communications interface 624 via a communication path (i.e., channel) 626. Communication path 626 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 610 and secondary memory 612, removable storage drive 616, and a hard disk installed in hard disk drive 614. Computer programs (also called computer control logic) are stored in main memory 610 and/or secondary memory 612. Computer programs also can be received via communications interface 624. Such computer programs, when run, enable the computer system to perform the features discussed herein. In particular, the computer programs, when run, enable processor 602 to perform the features of the computer system. Accordingly, such computer programs represent controllers of the computer system. Thus it can be seen from the foregoing detailed description that one or more embodiments provide technical benefits and advantages.

Figure 7:
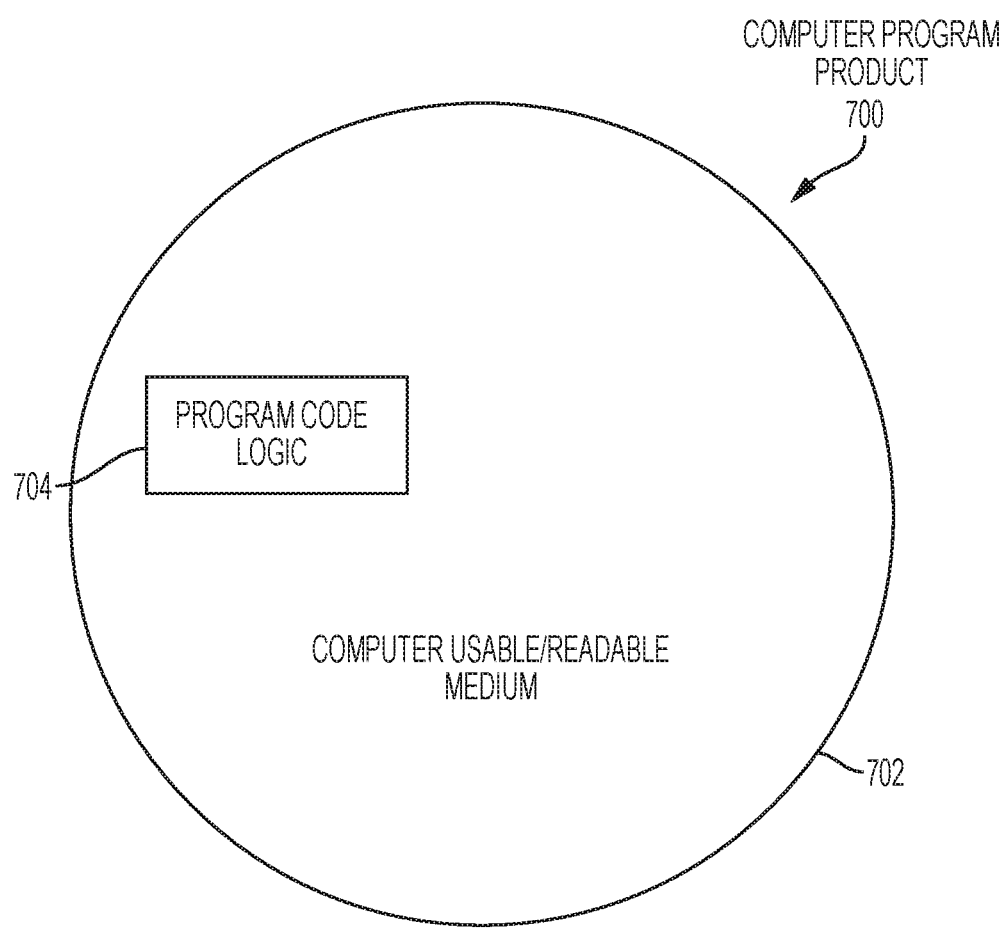
FIG. 7 depicts a computer program product, in accordance with one or more embodiments of the present invention.

FIG. 7 depicts a computer program product 700, in accordance with an embodiment. Computer program product 700 includes a computer-readable storage medium 702 and program instructions 704.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform aspects of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method comprising:
   determining, using a processor system, that a portion of media content is objectionable to an audience based at least on a comparison between an identified aspect of the portion of media content and a first set of preferences associated with the audience, wherein the first set of preferences defines a type of media content corresponding to the portion of media content as being objectionable to the audience, and the audience is associated with a primary viewing device;
   determining that the portion of media content is not objectionable to a member of the audience based at least on a second set of preferences, wherein the second set of preferences defines the type of media content corresponding to the portion of media content as not being objectionable to the member;
   playing the media content, without the portion determined to be objectionable, on the primary viewing device; and
   transmitting only the portion of the media content that is determined to be objectionable to a secondary viewing device of the member of the audience.

2. The computer-implemented method of claim 1, wherein the transmitting only the portion of media content comprises generating a summary of the portion of media content and transmitting the summary to the secondary viewing device, wherein the summary is a textual summary of the portion of the media content that is determined to be objectionable.

3. The computer-implemented method of claim 2, wherein the summary is generated based at least on a source selected from the group consisting of a subtitle file that is associated with the portion of media content, a result of performing optical character recognition on close-captioned text, a crowd-sourced summary, and an available script that is associated with the portion of media content.

4. The computer-implemented method of claim 1, wherein each member of the audience has a corresponding electronic profile that indicates a set of preferences.

5. The computer-implemented method of claim 1, wherein the transmitting only the portion of the media content comprises transmitting the portion of media content via a short-messaging-system communication.

6. The computer-implemented method of claim 1, wherein the transmitting only the portion of the media content comprises transmitting the portion of media content via a push notification.

7. The computer-implemented method of claim 1, wherein the transmitting only the portion of the media content is performed in accordance with a method identified within an electronic profile of the member.

8. A computer system comprising:
 a memory; and
 a processor system communicatively coupled to the memory;
 the processor system configured to perform a method comprising:
  determining that a portion of media content is objectionable to an audience based at least on a comparison between an identified aspect of the portion of media content and a first set of preferences associated with the audience, wherein the first set of preferences defines a type of media content corresponding to the portion of media content as being objectionable to the audience, and the audience is associated with a primary viewing device;
  determining that the portion of media content is not objectionable to a member of the audience based at least on a second set of preferences, wherein the second set of preferences defines the type of media content corresponding to the portion of media content as not being objectionable to the member;
  playing the media content, without the portion determined to be objectionable, on the primary viewing device; and
  transmitting only the portion of the media content that is determined to be objectionable to a secondary viewing device of the member of the audience.

9. The computer system of claim 8, wherein the transmitting only the portion of media content comprises generating a summary of the portion of media content and transmitting the summary to the secondary viewing device, wherein the summary is a textual summary of the portion of the media content that is determined to be objectionable.

10. The computer system of claim 9, wherein the summary is generated based at least on a source selected from the group consisting of a subtitle file that is associated with the portion of media content, a result of performing optical character recognition on close-captioned text, a crowd-sourced summary, and an available script that is associated with the portion of media content.

11. The computer system of claim 8, wherein each member of the audience has a corresponding electronic profile that indicates a set of preferences.

12. The computer system of claim 8, wherein the transmitting only the portion of the media content comprises transmitting the portion of media content via a short-messaging-system communication.

13. The computer system of claim 8, wherein the transmitting only the portion of the media content comprises transmitting the portion of media content via a push notification.

14. The computer system of claim 8, wherein the transmitting only the portion of the media content is performed in accordance with a method identified within an electronic profile of the member.

15. A computer program product comprising:
 a computer-readable storage medium having program instructions embodied therewith, the program instructions readable by a processor system to cause the processor system to perform a method comprising:
  determining that a portion of media content is objectionable to an audience based at least on a comparison between an identified aspect of the portion of media content and a first set of preferences associated with the audience, wherein the first set of preferences defines a type of media content corresponding to the portion of media content as being objectionable to the audience, and the audience is associated with a primary viewing device;
  determining that the portion of media content is not objectionable to a member of the audience based at least on a second set of preferences, wherein the second set of preferences defines the type of media content corresponding to the portion of media content as not being objectionable to the member;
  playing the media content, without the portion determined to be objectionable, on the primary viewing device; and
  transmitting only the portion of the media content that is determined to be objectionable to a secondary viewing device of the member of the audience.

16. The computer program product of claim 15, wherein the transmitting only the portion of media content comprises generating a summary of the portion of media content and transmitting the summary to the secondary viewing device, wherein the summary is a textual summary of the portion of the media content that is determined to be objectionable.

17. The computer program product of claim 16, wherein the summary is generated based at least on a source selected from the group consisting of a subtitle file that is associated with the portion of media content, a result of performing optical character recognition on close-captioned text, a crowd-sourced summary, and an available script that is associated with the portion of media content.

18. The computer program product of claim 15, wherein each member of the audience has a corresponding electronic profile that indicates a set of preferences.

19. The computer program product of claim 15, wherein the transmitting only the portion of the media content comprises transmitting the portion of media content via a short-messaging-system communication.

20. The computer program product of claim 15, wherein the transmitting only the portion of the media content comprises transmitting the portion of media content via a push notification.

* * * * *